United States Patent
Jayaraj et al.

(10) Patent No.: US 10,819,628 B1
(45) Date of Patent: Oct. 27, 2020

(54) VIRTUAL LINK TRUNKING CONTROL OF VIRTUAL ROUTER REDUNDANCY PROTOCOL MASTER DESIGNATION

(71) Applicant: Dell Products L.P., Round Rock, TX (US)

(72) Inventors: Rajashekar Jayaraj, Urapakkam (IN); Pugalendran Rajendran, Coimbatore (IN); Senthil Nathan Muthukaruppan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/390,746

(22) Filed: Apr. 22, 2019

(51) Int. Cl.
 *H04L 12/56* (2006.01)
 *H04L 12/713* (2013.01)
 *G06F 9/455* (2018.01)
 *H04L 12/66* (2006.01)
 *H04L 12/46* (2006.01)

(52) U.S. Cl.
 CPC ........ *H04L 45/586* (2013.01); *G06F 9/45558* (2013.01); *H04L 12/4641* (2013.01); *H04L 12/66* (2013.01); *G06F 2009/45595* (2013.01)

(58) Field of Classification Search
 CPC ... H04L 45/586; H04L 12/4641; H04L 12/66; G06F 9/45558
 USPC ............................ 370/400–409; 709/208–209
 See application file for complete search history.

(56) References Cited

U.S. PATENT DOCUMENTS

| | | | | |
|---|---|---|---|---|
| 7,036,051 | B1* | 4/2006 | Fernandes | H04L 45/00 714/43 |
| 2013/0201820 | A1* | 8/2013 | Xiaoyong | H04L 41/06 370/220 |
| 2016/0085560 | A1* | 3/2016 | Gourlay | G06F 9/4416 713/2 |
| 2017/0257313 | A1* | 9/2017 | Helen | H04L 45/28 |
| 2019/0273716 | A1* | 9/2019 | Sundarababu | H04L 61/103 |

OTHER PUBLICATIONS

Nadas, S. "Virtual Router Redundancy Protocol (VRRP) Version 3 for IPv4 and IPv6", Internet Engineering Task Force (IETF), Standards Track, Mar. 2010, https://tools.ietf.org/html/rfc5798.

* cited by examiner

*Primary Examiner* — Thai D Hoang
(74) *Attorney, Agent, or Firm* — Norton Rose Fulbright US LLP (57) ABSTRACT

A first information handling system may detect a VRRP configuration of the first information handling system and a peer information handling system, along with a VLT connection between the first information handling system and the peer information handling system. VLT control information may be used by the first information handling system to designate the first information handling system as a VRRP master node. The first information handling system may then control VRRP operation of the first information handling system and the peer information handling system based, at least in part, on the designation of the first information handling system as the VRRP master node.

20 Claims, 4 Drawing Sheets

VIRTUAL LINK TRUNKING CONTROL OF VIRTUAL ROUTER REDUNDANCY PROTOCOL MASTER DESIGNATION

FIELD OF THE DISCLOSURE

The instant disclosure relates to communication between information handling systems. More specifically, portions of this disclosure relate to designation of a virtual router redundancy protocol (VRRP) master in a network of information handling systems.

BACKGROUND

As the value and use of information increase, individuals and businesses seek additional ways to process and store information. One option available for such a purpose is the information handling system (IHS). An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be connected to each other to share information. For example, client information handling systems, such as personal computers, laptops, tablets, servers, switches, routers, and other information handling systems may be connected to each other via intermediary information handling systems, such as routers and switches, to facilitate transmission and receipt of information. As the number of interconnected information handling systems increases, the complexity of networks of intermediary information handling systems, to facilitate information sharing, also increases.

Multiple peer routers or switches (intermediary information handling systems) may be connected to a plurality of networked client information handling systems to facilitate transmission of information from and receipt of information by the client information handling systems. In some cases, peer routers or switches may be connected to provide redundancy, with one designated as a master to facilitate transmission of information, and others designated as backups to assume control if the master fails. Peer routers and/or switches may be connected to act as a single logical unit, with all routers or switches configured to actively transmit information from and receive information for client information handling systems. Such router configurations, however, may result in transmission of substantial amounts of control information, for coordinating operation of the routers. Transmission of such control information takes bandwidth from user communications, slowing down the user's experience.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An amount of control information transmitted by peer information handling systems may be reduced by sharing control information among multiple connection protocols. The sharing of control information may reduce transmission of redundant information. Virtual link trunking (VLT) protocol control information may be used by information handling systems to designate a first information handling system as a virtual router redundancy protocol (VRRP) master node and a second information handling system as a VRRP backup node. Sharing of control information may reduce VRRP control information sent between nodes, because the VRRP protocol does not need to separately coordinate selection of master/backup nodes. Sharing may also reduce VRRP control packets transmitted between the master/backup node and client information handling systems because a VRRP advertisement interval on both the master and backup nodes may be increased. Thus, using VLT information to designate an information handling system as a master VRRP node can allow for a reduction in VRRP control information transmitted on the network. Reducing control information can enhance data transmission speeds and reduce latency, enhancing a user experience.

When peer information handling systems are configured to operate together according to a VRRP configuration and connected via a VLT connection, VLT control information may be used to designate one of the peer information handling systems as a VRRP master node and the peer remaining information handling systems as backup VRRP nodes. A first information handling system, such as a switch or router, may detect a VRRP configuration of itself and a peer information handling system, such as a peer switch or router. The first information handling system and the peer information handling system may be configured to operate together according to VRRP, with one peer designated as the master VRRP node and the other peer designated as a backup VRRP node. For example, a VRRP connection may be negotiated between a first information handling system and one or more peer information handling systems for selection of an information handling system to act as a VRRP master. The VRRP connection may allow for designation of an information handling system as a VRRP master node to control routing of information by the first information handling system and the peer information handling systems and designation of a second information handling system as a VRRP backup node to become the master node in the case of a failure of a currently designated master node. With a VRRP configuration, a virtual router may be created so that the first information handling system and second information handling system may function as a single router. The VRRP master node may control and have priority over VRRP backup node.

A VLT connection between the first information handling system and one or more peer information handling systems may be detected. For example, the first information handling system and peer information handling systems may be configured to operate together according to a VLT protocol, and the first information handling system may receive VLT control information from the peer information handling system. In some cases, the VLT connection may also connect the first information handling system and peer information handling systems to one or more client information handling systems. For example, the first information handling system may negotiate a VLT connection with peer and client information handling systems. The VLT connection may allow information to be received from client information handling systems by the first information handling system and a peer information handling system and forwarded from the receiving information handling system to a destination without requiring transfer of the received information to an information handling system that is designated as a master or primary information handling system.

VLT control information may be used to influence VRRP master/backup node selection. After a VRRP configuration of and VLT connection between the first information handling system and the peer information handling system are detected, VLT control information, received over the VLT connection, may be used to designate either the first information handling system or the peer information handling system as a VRRP master node. The VLT control information may designate one of the information handling systems as a primary VLT node. The primary VLT node may then be designated as the VRRP master node. For example, the first information handling system may receive and/or generate VLT control information indicating that the first information handling system is designated as a primary VLT node. The first information handling system may use the VLT control information to designate itself as a VRRP master node. Likewise, the peer information handling system may receive or generate VLT control information indicating that the first information handling system is designated as a primary VLT node and may designate itself as a VRRP backup node based on the VLT control information.

The information handling system designated as the VRRP master node may control VRRP operation of the first information handling system and the peer information handling system. For example, the VRRP master node may establish a VRRP advertisement interval for both the first information handling system and the second information handling system. The VRRP master node may also, in some embodiments, establish a VMAC address for the first information handling system and the second information handling system.

When a first information handling system and a peer information handling system are connected via VRRP and VLT connections, transmission of VRRP control information, such as VRRP control packets, between the first information handling system and a peer information handling system may be halted. For example, VRRP control packets may be used by the first information handling system and peer information handling systems to determine which of the information handling systems will be designated as a VRRP master node. VRRP control information may also be used by the first information handling system and the peer information handling system to verify that a master node is operational. When VLT information is used to designate an information handling system as a VRRP master node, VRRP control information need not be transmitted between the first information handling system and the peer information handling system.

When a first information handling system and the peer information handling system are connected via VRRP and VLT connections a VRRP advertisement interval of the first information handling system and the peer information handling system may be increased to reduce VRRP information being transmitted on the network. For example, the VRRP advertisement interval may be increased, but its level maintained below a media access control (MAC) age out time of client information handling systems. VRRP control information may continue to be used by client information handling systems to determine a virtual MAC (VMAC) address of the first information handling system and the peer information handling system while the frequency of such transmissions may be reduced. As VLT control information may be used to designate a VRRP master node, an advertisement interval of VRRP control information to client information handling systems may be increased with minimal impact on network performance.

A VRRP backup node may be designated as the VRRP master node when a VRRP master node experiences a failure. Example failures include failure of a virtual local area network (VLAN) module of the VRRP master node or a system failure the VRRP master node. For example, the first information handling system may detect a failure of a virtual local area network (VLAN) module of the first information handling system and then notify a peer information handling system of the failure. A VLT module of the first information handling system may notify a VLT module of a peer information handling system of the failure. Based on the notification, the VLT module of the peer information handling system may instruct a VRRP module of the peer information handling system to change a designation of the peer information handling system from designation as a VRRP backup node to designation as a VRRP master node. In some embodiments, a failure of a single VLAN may be detected by the first information handling system. When a failure of a single VLT VLAN is detected, the peer information handling system may be designated as a VRRP master node for the single failed VLAN, while the first information handling system may remain the VRRP master node for any remaining functional VLANs. When the VLAN module of the first information handling system regains functionality, the first information handling system may be designated as the master VRRP node and the peer information handling system may be designated as the backup VRRP node.

An information handling system designated as a VRRP backup node may detect failures of the VRRP master node and execute one or more actions in response to maintain network integrity. For example, the VRRP backup node may determine a problem exists during a reboot, failure of a link between the master node and one or more backup nodes, or other system failure, although the VRRP backup node may determine only that a problem exists rather than the cause of the problem. For example, when the first information handling system is designated as the VRRP backup node and a peer information handling system is designated as a VRRP master node, the first information handling system may detect that the peer information handling system has experienced a system failure when the first information handling system fails to receive status information from the peer information handling system or when the first information handling system is unable to communicate with the peer information handling system. When such a failure is detected, the VLT module of the first information handling system may instruct the VRRP module of the first information handling system to designate the first information handling system as the VRRP master node. When the peer information handling system regains functionality, the peer information handling system may be designated as the VRRP master node and the first information handling system may be designated as the VRRP backup node.

An information handling system may include a processor for performing the steps described herein. A computer program product may include a non-transitory computer readable medium comprising instructions to perform the steps described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, a network switch, a network router, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Information handling systems may be networked to exchange information. For example, in example network topology 100 of FIG. 1, client information handling systems 102A-D may communicate with an external network 106 through intermediary information handling systems, such as switches 104A-B. Switches 104A-B may receive information from client information handling systems 102A-D and may forward such information across network 106 to remote information handling systems. Likewise, switches 104A-B may receive information transmitted from remote information handling systems via network 106 and may forward received information to client information handling systems 102A-D. Client information handling systems 102A-D may, for example, include personal computers, servers, smart phones, switches, routers, and other information handling systems. For example, in some embodiments, client information handling systems 102A-D may be top of rack (TOR) switches connecting servers to switches 104A-B.

Figure 1:
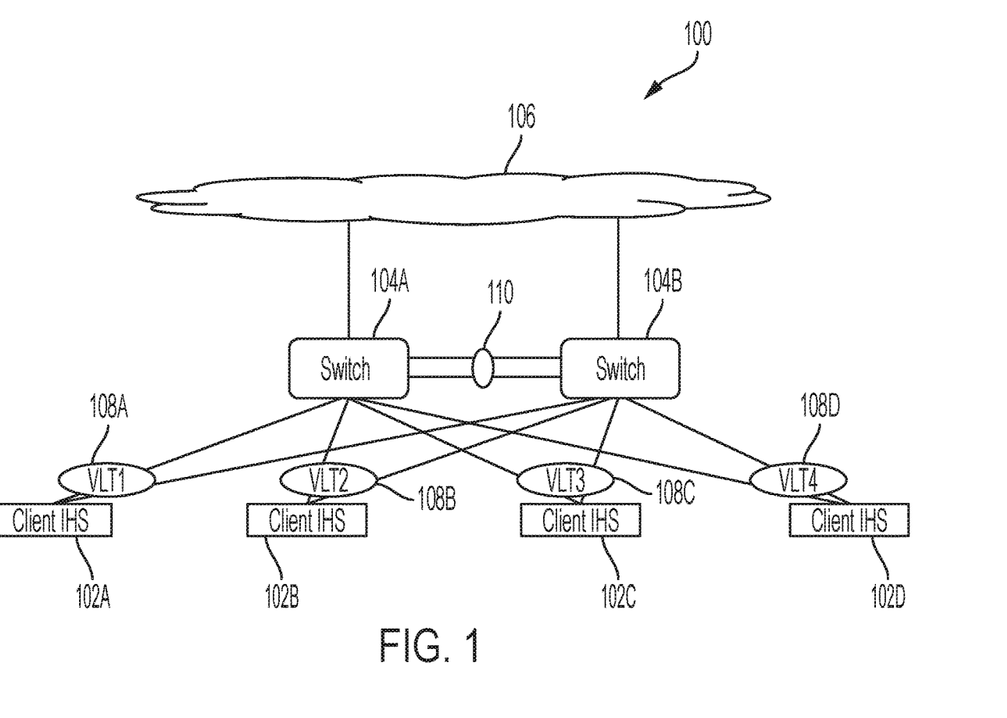
FIG. 1 is a block diagram of an example network topology according to some embodiments of the disclosure.

Switches 104A-B may be located at the same level of the network topology and may thus be peer information handling systems. In order to enhance resiliency of the network topology 100, a virtual router redundancy protocol (VRRP) may be used to configure switches 104A-B to work in concert to receive and forward information. For example, the VRRP may create a virtual router operating across switches 104A-B which may be assigned to client information handling systems 102A-D and may enable the switches 104A-B to operate as a group. In a VRRP configuration, there may be a redundancy between the two switches 104A-B with one acting as a default gateway and the other acting as a backup gateway, in case of failure of the default gateway. Using VRRP, one switch, such as switch 104A, may be designated as the master switch, while a peer switch, such as switch 104B, may be designated as the backup switch. The master switch 104A may control operation of the switches. In some configurations, the master switch may route all traffic from client information handling systems 102A-D while backup switch 104B may be held in reserve to begin transmitting information from client information handling systems if the master switch 104A fails. For example, if the backup switch 104B receives information from a client information handling system, it may forward the information to the master switch 104A which may then forward the information to a destination on the external network 106. In other configurations, such as an active-active mode, both the master switch 104A and the backup switch 104B may transmit information from and receive information for client information handling systems 102A-D. VRRP control information may be transmitted between switches 104A-B via link 110. VRRP control information, may control one or more VRRP attributes, such as master and/or backup node status, of switches 104A-B. Link 110 may, for example, include a VLT interconnect (VLTi) connection. The switches 104A-B may communicate via link 110 to establish which switch is designated as the VRRP master node and which switch is designated as the VRRP backup node. The switches 104A-B may transmit VRRP control information to each other and to client information handling systems 102A-D which may include information detailing a VMAC of the virtual router operating across switches 104A-B, IP addresses of the switches 104A-B, and other information.

In order to further enhance information transmission capabilities of the network 100, virtual link trunking (VLT) may be used on the switches 104A-B and the client information handling systems 102A-D to allow information from the client information handling systems 102A-D to be forwarded to external network 106 via both switches 104A-B via trunked virtual local area networks (VLANs). For example, the switches 104A-B may be connected together via a VLT connection, such as a VLT interconnect, on connection 110. Switches 104A-B may exchange VLT control information, such as protocol state information, MAC addresses, and ARP tables, via the VLT interconnect. For example, VLT control information may include information for designating one of switches 104A-B as a primary VLT node and the other as a secondary VLT node. One of switches 104A-B may be designated as a primary VLT node and may manage the connection and the other may be designated as a secondary VLT node. The VLT connection of the switches 104A-B may be configured for deterministic failover so that if the primary VLT node fails the secondary VLT node will assume functionality as the primary VLT node. Furthermore, the switch designated as the secondary VLT node may be configured to shut down if the VLT interconnect fails. Switches 104A-B and client information handling systems 102A-D may be connected via both a VLT connection and a VRRP connection.

The switches 104A-B connected via the VLT connection may act as a single logical entity to client information handling systems 102A-D, such that information from or for any of the client information handling systems may be forwarded through either of switches 104A-B. Switches 104A-B may be connected to client information handling systems 102A-D via a two-way VLT fabric having four VLT ports. For example, a first VLT virtual local area network (VLAN) 108A may connect a first client information handling system 102A to switches 104A-B. A second VLT VLAN 108B may connect a second client information handling system 102B to switches 104A-B. A third VLT VLAN 108C may connect a third client information handling system 102C to switches 104A-B. A fourth VLT VLAN 108D may connect a fourth client information handling system 102D to switches 104A-B. Switches 104A-B may be configured with VRRP and VLT connections at the same time. Although only four VLT VLANs and client information handling systems are shown, additional client information handling systems may be connected to the switches 104A-B via additional VLT VLANs. VLANs 108A-D may also be configured for VRRP operation with switches 104A-B. If four VLANs 108A-D connecting client information handling systems 102A-D with switches 104A-B with VLT and VRRP connections are configured in VRRP active-active mode with an advertisement interval of one second, one VRRP control information packet may be transmitted from switches 104A-B via VLANs 108A-D to each of client information handling systems 102A-D every second. Furthermore, four VRRP control information packets may be transmitted every second across link 110 every second, for a total of eight VRRP control information packets per second. In some embodiments, an excess of 2000 VLANs may connect switches 404A-B to client information handling systems, for an excess of 8000 VRRP control information packets per second. Thus, transmission of VRRP control information may consume valuable bandwidth and lead to a slowdown in data transmission. A VRRP hello timeout may be increased to reduce a number of VRRP control information packets transmitted, but such an increase may increase the amount of time required for VRRP convergence such as detection of a failure of a VRRP master switch and designation of a new VRRP master switch in response.

In conventional systems, network protocols are unaware of each other and thus may transmit redundant information. When switches 104A-B and client information handling systems 102A-D are connected via VRRP and VLT connections, redundant information may be transmitted across VRRP and VLT connections. For example, router status information may be transmitted via both VRRP and VLT connections between switch 104A and switch 104B and between switches 104A-B and client information handling systems 102A-D. In embodiments of the present disclosure, information may be shared between protocols to reduce this redundant transmission. VLT control information may be used to designate a VRRP master node, in order to reduce transmission of redundant information and free bandwidth for transmission of user information. For example, VLT control information, including information designating one of the switches 104A-B as the primary VLT node, may be used to designate the primary VLT node as the master VRRP node for all VLANs 108A-D. When VLT control information is used to designate which of switches 104A-B is the VRRP master, transmission of VRRP control information between switches 104A-B, such as information for designating one of the switches 104A-B as the VRRP master node, may be reduced or eliminated. For example, transmission of VRRP control information across an VLTi connection between the switches 104A-B may be halted. Furthermore, a VRRP advertisement interval for transmission of VRRP control information to client information handling systems 102A-D may be increased. For example, VRRP control information may be advertised to client information handling systems 102A-D to inform the client information handling systems of a VMAC address of a virtual router operating across switches 104A-B and which of the switches 104A-B is designated as the VRRP master node. In order to prevent a timeout of the VRRP connection between the switches 104A-B and the client information handling systems 102A-D, the VRRP advertisement interval of switches 104A-B may be reduced to a value less than a MAC age out time of the client information handling systems 102A-D.

Figure 2:
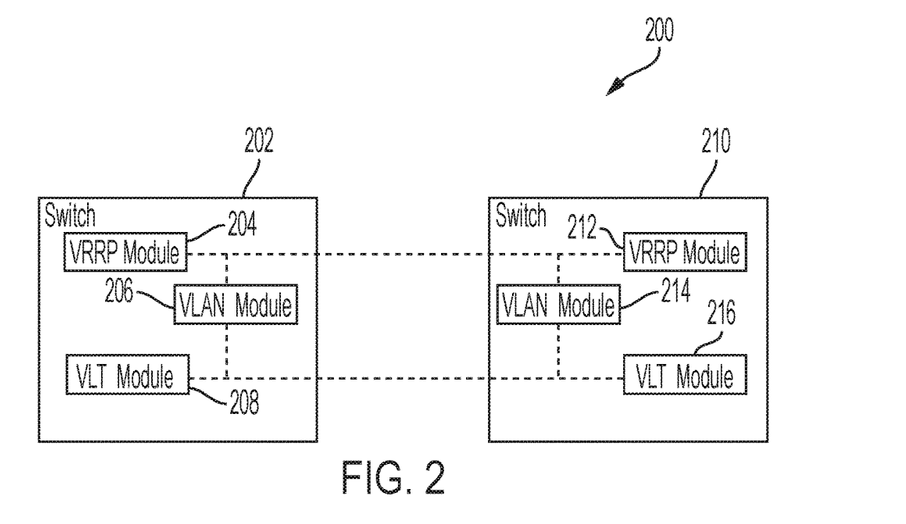
FIG. 2 is a block diagram of example peer information handling systems with communication between VRRP modules and VLT modules according to some embodiments of the disclosure.

A first switch 202 may communicate with a second switch 210, as shown in system 200 of FIG. 2. The first switch 202 may be designated as a VRRP master switch based on communication between the switches 202, 210, while the second switch 210 may be designated as a VRRP backup switch. The VRRP master switch 202 may include a VRRP module 204 and a VLT module 208. VRRP and VLT modules 204, 208 may be hardware or software modules. For example, in some embodiments VRRP and VLT modules 204, 208 may be software protocol instructions for forming and maintaining VRRP and VLT configurations and connections of information handling systems. The VRRP backup switch 210 may include a VRRP module 212 and a VLT module 216. The VRRP master switch 202 and the VRRP backup switch 210 may also include VLAN modules 206, 214 which may communicate with VRRP modules 204, 212 and VLT modules 208, 216 to manage one or more VLANs operated by the VRRP master switch 202 and the VRRP backup switch 210. The VRRP module 204 of the VRRP master switch 202 may transmit VRRP control information to and receive VRRP control information from the VRRP module 212 of the backup switch 210. For example, the first switch 202 and the second switch 210 may be designated as the VRRP master switch and VRRP backup switch based on communication of VRRP control information between the VRRP modules 204, 212 of the first and second switches 202, 210. The VLT module 208 of the VRRP master switch 202 may transmit VLT control information to and receive control information from the VLT module 216 of the VRRP backup switch 210. Furthermore, the VRRP module 204 and the VLT module 208 of the master switch 202 and the VRRP module 212 and the VLT module 216 of the backup switch may transmit VRRP and VLT control information to client information handling systems, as discussed with respect to FIG. 1. As discussed above, the VLT and VRRP control information transmitted between the VRRP master switch 202 and the VRRP backup switch may include redundant information. Transmission of redundant information may monopolize bandwidth that could otherwise be used for transmission of user data, which may lead to a slowdown of data transmission across system 200.

Figure 3:
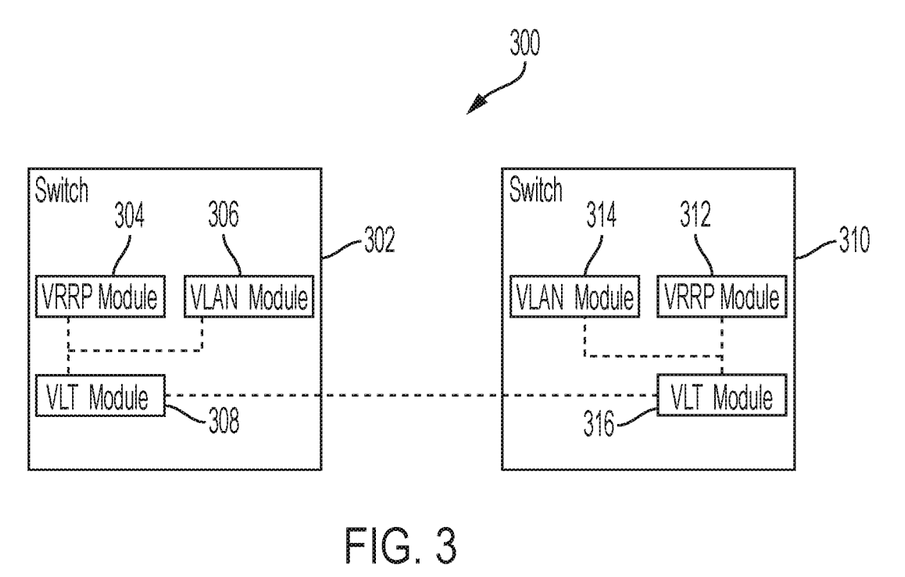
FIG. 3 is a block diagram of example peer information handling systems with communication between VLT modules according to some embodiments of the disclosure.

When switches 302, 310 are configured to operate in concert according to a VRRP protocol and a VLT protocol, VLT control information communicated between the switches may be used to designate a first switch 302 as the VRRP master switch and a second switch 310 as the VRRP backup switch, as shown in FIG. 3. For example, the first switch 302 may include a VRRP module 304 and a VLT module 308. The second switch 310 may include a VRRP module 312 and a VLT module 316. The first switch 302 and the second switch 310 may also include VLAN modules 306, 314 which may communicate with VRRP modules 304, 312 and VLT modules 308, 316 to manage one or more VLANs operated by the first switch 302 and the second switch 310. VLT control information may be transmitted between the VLT module 308 of the first switch 302 and the VLT module 316 of the second switch 310. The VLT module 308 of the first switch 302 may communicate with the VRRP module 304 of the first switch 302 to designate the first switch 302 as the VRRP master switch based on VLT information, such as information indicating a VLT primary node designation, transmitted between the VLT modules 308, 316 of the first and second switches 302, 310. Likewise, the VLT module 316 of the second switch 310 may communicate with the VRRP module 312 of the second switch 310 to designate the second switch 310 as the VRRP backup switch based on VLT information transmitted between the VLT modules 308, 316 of the first and second switches 302, 310. Thus, transmission of VRRP control information between VRRP modules 306, 312 may be halted when VRRP master and VRRP backup status of switches 302, 310 is determined based on VLT control information.

Figure 4:
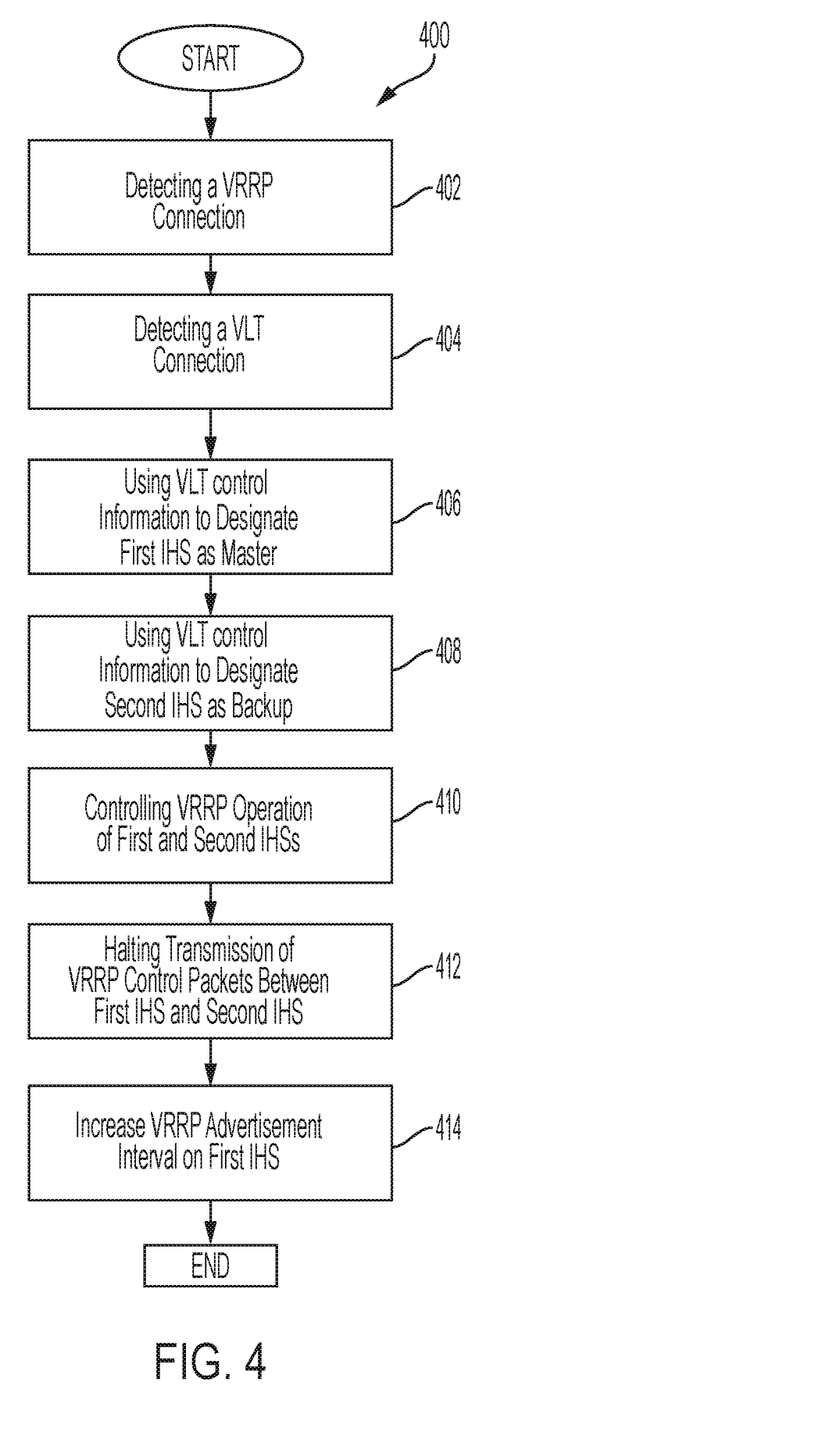
FIG. 4 is a flow chart of an example method for determining VRRP designation of information handling systems using VLT control information according to some embodiments of the disclosure.

An example method 400 for designating an information handling system as a VRRP master information handling system is shown in FIG. 4. The method 400 may begin, at step 402, with detecting a VRRP configuration. For example, a first information handling system may detect that the first information handling system and a second information handling system, which may be a peer of the first information handling system, are configured to operate together in a master-backup VRRP configuration according to a VRRP configuration of the first information handling system and the second information handling system. The first information handling system and the second information handling system may be switches or routers. In some embodiments detecting a VRRP configuration may include transmitting VRRP information, such as VRRP control information, between the first information handling system and the second information handling system to verify that the first information handling system and the second information handling system are configured to jointly operate according to a VRRP configuration. For example, the first information handling system may detect a VRRP configuration of the second information handling system when VRRP control information is received from the second information handling system.

At step 404, a VLT connection may be detected. For example, a first information handling system may detect that the first information handling system and a second information handling system are configured to operate in together as primary and secondary nodes in a VLT configuration and a VLT communication link between the first and second information handling systems. The first information handling system may detect one or more client information handling systems configured to transmit information to the first information handling system and the second information handling system via one or more VLT VLANs. In some embodiments, detecting a VLT connection may include transmitting VLT control information between the first and second information handling systems to establish the VLT connection between the first information handling system and the second information handling system. For example, the first information handling system may detect a VLT connection by receiving VLT control information from the second information handling system. Detecting a VLT connection may also include receiving VLT control information from one or more client information handling systems.

At step 406, VLT control information may be used to designate the first information handling system as the master VRRP node. For example, a VLT module of the first information handling system may communicate with a VRRP module of the first information handling system to designate the first information handling system as the master VRRP node based on VLT control information communicated between the first information handling system and the second information handling system. Thus, the first information handling system may be designated as the master VRRP node based on VLT control information and not VRRP control information. The first information handling system may be designated as the master VRRP node when VLT control information received or generated by the VLT module of the first information handling system indicates that the first information handling system is designated as the primary VLT node.

At step 408, VLT control information may be used to designate a second information handling system, which may be a second of the first information handling system, as the backup VRRP node. For example, a VLT module of the second information handling system may communicate with a VRRP module of the second information handling system to designate the second information handling system as the VRRP backup node based on VLT control information communicated between and/or generated by the first information handling system and the second information handling system. Thus, the second information handling system may be designated as the backup VRRP node based on VLT control information and not VRRP control information. For example, the second information handling system may be designated as the backup VRRP node when VLT control information received by the VLT module of the second information handling system indicates that the second information handling system is designated as the secondary VLT node.

At step 410, VRRP operation of the first and second information handling systems may be controlled based, at least in part on the designation of the master VRRP node. For example, if the first information handling system is designated as the master VRRP node, it may assume control of VRRP operation of the first and second information handling systems. In some embodiments, the first information handling system may also control VRRP operation of one or more client information handling systems For example, the first information handling system may establish a VRRP advertisement interval for both the first information handling system and the second information handling system. The first information handling system may also, in some embodiments, establish a VMAC address for the first information handling system and the second information handling system. The VMAC address may be transmitted in VRRP advertisement packets to client information handling systems, to allow the client information handling systems to operate according to VRRP, transmitting information to and receiving information from either of the first and second information handling systems.

When first and second information handling systems use VLT control information to designate the first information handling system as the VRRP master and the second information handling system as the VRRP backup, transmission of VRRP control information between the first information handling system and the second information handling system may be halted, at step 412. VRRP control information may be used by the first information handling system and the second information handling system to determine which of the information handling systems is the master VRRP node and which is the backup VRRP node, but when VLT control information is used to make such a determination, transmission of VRRP control information between the first and second information handling systems may be halted, to avoid transmission of redundant or unneeded information. Thus, system bandwidth may be freed up by halting transmission of VRRP control information between the first and second information handling systems.

At step 414, a VRRP advertisement interval may be increased. For example, when VLT control information is used to designate the first information handling system as the VRRP master node and the second information handling system as the VRRP backup node, an interval for transmission of VRRP control information from the first information handling system and the second information handling system to one or more client information handling systems may be increased. VRRP control information may be transmitted to one or more client information handling systems to facilitate VRRP operation of the network. However, VLT control information transmitted to the client information handling systems may render VRRP control information, at least partially, redundant. Some VRRP control information may still be transmitted to prevent a timeout of the VRRP connection between the first and second information handling systems and the client information handling systems, so an advertisement interval for transmission of VRRP control information may be increased. In order to prevent a timeout of the VRRP connection between first and second information handling systems and the client information handling systems, a VRRP advertisement interval of the first and second information handling systems may be increased to a value less than a MAC age out time of the client information handling systems. Such an increase may reduce the amount of VRRP control information transmitted across the system, freeing up bandwidth for transmission of user data. Thus, VLT control information may be used to designate a first information handling system as a VRRP master node and a second information handling system as a VRRP backup node, allowing for reduced transmission of VRRP control information.

Figure 5:
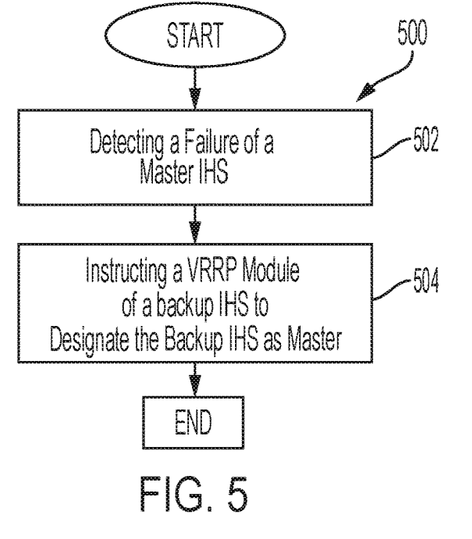
FIG. 5 is a flow chart of an example method for responding to a system failure of an information handling system designated as a master VRRP node according to some embodiments of the disclosure.

When transmission of VRRP control information between peer information handling systems is reduced or eliminated, VLT control information may be used to determine designation of a backup VRRP node as a master VRRP node when the master VRRP node fails. An example method 500 for responding to a system failure of a master VRRP node is shown in FIG. 5. A system failure may, for example, include a system reboot or crash or a failure of a VLT communication link between the VRRP master node and the VRRP backup node. The method 500 may begin, at step 502, with detecting a failure of an information handling system designated as a master VRRP node. For example, a VLT module of a first information handling system designated as a backup VRRP node may detect a failure of a second information handling system designated as the master VRRP node to transmit status information or a failure of the master VRRP node to respond to a query from the first information handling system. In a system failure, a failure may be detected for all VLANs for which the second information handling system is designated as the master VRRP node.

At step 504, a VRRP module of a backup VRRP node may be instructed to designate the backup VRRP node as the master VRRP node. For example, a VLT module of a first information handling system designated as the VRRP backup node may, upon detection of a failure of a second information handling system designated as the VRRP master node, instruct a VRRP module of the first information handling system to change a designation of the first information handling system from designation as the VRRP backup node to designation as the VRRP master node. The first information handling system may, for example, designate itself as the VRRP master node for all VLANs for which the second information handling system was designated as the VRRP master node. If the second information handling system recovers from the failure, the VLT module of the first information handling system may detect the recovery and may instruct the VRRP module of the first information handling system to revert its designation to backup VRRP node. In some cases, a VRRP configuration of the first information handling system and the second information handling system may instruct the first information handling system to maintain VRRP master node designation when the second information handling system regains functionality.

Figure 6:
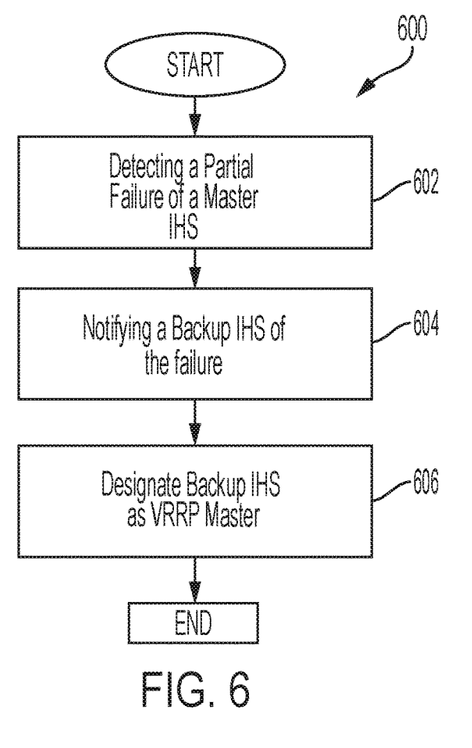
FIG. 6 is a flow chart of an example method for responding to a partial failure of an information handling system designated as a master VRRP node according to some embodiments of the disclosure.

In some cases, a first information handling system designated as a VRRP master node may experience a failure that is not system wide and may be able to notify a second information handling system designated as the VRRP backup node of the failure. A method 600 for adjusting a VRRP designation of a second information handling system based on failure of a first information handling system is shown in FIG. 6. The method 600 may begin at step 602 with detecting a partial failure of a first information handling system designated as the VRRP master node. For example, a first information handling system may detect a failure of an internal component, such as a VLAN module. In some embodiments, the first information handling system may be designated as the VRRP master node for multiple VLANs, and the detected failure may be a failure of a single VLAN.

At step 604, a second information handling system, designated as a VRRP backup node, may be notified of the failure. For example, a first information handling system may transmit a notification via a VLT connection between the first information handling system and the second information handling system that a failure, such as a failure of a VLAN module of the first information handling system, has occurred and that the first information handling system is no longer able to function as the VRRP master node. In some embodiments, the first information handling system may notify the second information handling systems of which VLANs have failed.

At step 606, the second information handling system may be designated as the VRRP master node, based on the notification. For example, a VLT module of the second information handling system may receive a notification from a VLT module of the first information handling system that the first information handling system is no longer able to function as the VRRP master node. The VLT module of the second information handling system may then instruct a VRRP module of the second information handling system to designate the second information handling system as the VRRP master node. For example, if the partial failure is a failure of a single VLAN, the second information handling system may be designated as the VRRP master node for the single failed VLAN, while the first information handling system may continue to be designated as the VRRP master node for additional VLANs for which a failure was not detected. Thus, when a VRRP master node experiences a partial failure, it may notify a VRRP backup node of the partial failure via a VLT connection and the VRRP backup node may assume the role of VRRP master node.

The schematic flow chart diagrams of FIGS. 4-6 are generally set forth as logical flow diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for selecting a virtual router redundancy protocol (VRRP) master node, the method comprising:
   detecting, by a first information handling system, a VRRP configuration of the first information handling system and a peer information handling system;
   detecting, by the first information handling system, a virtual link trunking (VLT) connection between the first information handling system and the peer information handling system;
   designating, by the first information handling system, the first information handling system as the VRRP master node based, at least in part, on VLT control information received by the first information handling system via the VLT connection; and
   controlling, by the first information handling system, VRRP operation of the first information handling system and the peer information handling system based, at least in part, on the designation of the first information handling system as the VRRP master node.

2. The method of claim 1, wherein controlling VRRP operation of the information handling system and the peer information handling system comprises establishing a virtual media access control (VMAC) address for the first and peer information handling systems.

3. The method of claim 1, further comprising halting transmission of VRRP control information between the first information handling system and the peer information handling system after detecting the VRRP configuration and the VLT connection.

4. The method of claim 1, further comprising increasing a VRRP advertisement interval on the first information handling system while maintaining the VRRP advertisement interval at a level below a media access control (MAC) age out time of at least one client information handling system connected to the first information handling system and the peer information handling system via the VLT connection.

5. The method of claim 1, wherein the VLT control information designates the first information handling system as a primary VLT node, and wherein the step of designating the first information handling system comprises designating the first information handling system as the VRRP master node based, at least in part, on the designation of the first information handling system as the primary VLT node.

6. The method of claim 1, further comprising:
detecting, by the first information handling system, a failure of a virtual local area network (VLAN) module of the first information handling system; and
notifying, by the first information handling system via the VLT connection, the peer information handling system of the failure of the VLAN module to instruct the peer information handling system to change its designation to a designation as a VRRP master node.

7. The method of claim 1, further comprising:
detecting, by the peer information handling system, a failure of the first information handling system; and
instructing, by a VLT module of the peer information handling system, a VRRP module of the peer information handling system to designate the peer information handling system as the VRRP master node.

8. An information handling system comprising:
a processor,
wherein the processor is configured to perform steps comprising
detecting, by the information handling system, a virtual router redundancy protocol (VRRP) configuration of the information handling system and a peer information handling system;
detecting, by the information handling system, a virtual link trunking (VLT) connection between the information handling system and the peer information handling system;
designating the information handling system as a VRRP master node based, at least in part, on VLT control information received by the information handling system via the VLT connection; and
controlling, by the information handling system, VRRP operation of the information handling system and the peer information handling system based, at least in part, on the designation of the information handling system as the VRRP master node.

9. The information handling system of claim 8, wherein the information handling system and the peer information handling system comprise switches.

10. The information handling system of claim 8, wherein controlling VRRP operation of the information handling system and the peer information handling system comprises establishing a virtual media access control (VMAC) address for the first and peer information handling systems.

11. The information handling system of claim 8, wherein the processor is further configured to perform steps comprising halting transmission of VRRP control information between the information handling system and the peer information handling system after detecting the VRRP configuration and the VLT connection.

12. The information handling system of claim 8, wherein the processor is further configured to perform steps comprising increasing a VRRP advertisement interval on the first information handling system while maintaining the VRRP advertisement interval at a level below a media access control (MAC) age out time of at least one client information handling system connected to the information handling system and the peer information handling system via the VLT connection.

13. The information handling system of claim 8, wherein the VLT control information designates the information handling system as a primary VLT node, and wherein the step of designating the information handling system comprises designating the information handling system as the VRRP master node based, at least in part, on the designation of the information handling system as the primary VLT node.

14. The information handling system of claim 8, wherein the processor is further configured to performs steps comprising:
detecting, by the information handling system, a failure of a virtual local area network (VLAN) module of the information handling system; and
notifying, by the information handling system via the VLT connection, the peer information handling system of the failure of the VLAN module to instruct the peer information handling system to change its designation to designation as a VRRP master node.

15. A non-transitory computer readable medium comprising instructions, when executed by a processor, the instructions perform steps:
detecting, by a first information handling system, a virtual router redundancy protocol (VRRP) configuration of the first information handling system and a peer information handling system;
detecting, by the first information handling system, a virtual link trunking (VLT) connection between the first information handling system and the peer information handling system;
designating the first information handling system a VRRP master node based, at least in part, on VLT control information received by the first information handling system via the VLT connection; and
controlling, by the first information handling system, VRRP operation of the first information handling system and the peer information handling system based, at least in part, on the designation of the first information handling system as the VRRP master node.

16. The non-transitory computer readable medium product of claim 15, wherein controlling VRRP operation of the first information handling system and the peer information handling system comprises establishing a virtual media access control (VMAC) address for the first and peer information handling systems.

17. The non-transitory computer readable medium product of claim 15, wherein the non-transitory computer readable medium further comprises instructions to perform steps comprising halting transmission of VRRP control information between the first information handling system and the peer information handling system after detecting the VRRP configuration and the VLT connection.

18. The non-transitory computer readable medium product of claim 15, wherein the non-transitory computer readable medium further comprises instructions to perform steps comprising increasing a VRRP advertisement interval on the first information handling system while maintaining the VRRP advertisement interval at a level below a media access control (MAC) age out time of at least one client information handling system connected to the first information handling system and the peer information handling system via the VLT connection.

19. The non-transitory computer readable medium product of claim 15, wherein the VLT control information designates the first information handling system as a primary VLT node, and wherein the step of designating the first information handling system comprises designating the first information handling system as the VRRP master node based, at least in part, on the designation of the first information handling system as the primary VLT node.

20. The non-transitory computer readable medium product of claim 15, wherein the non-transitory computer readable medium further comprises instructions to perform steps comprising:
  detecting, by the first information handling system, a failure of a virtual local area network (VLAN) module of the first information handling system; and
  notifying, by the first information handling system via the VLT connection, the peer information handling system of the failure of the VLAN module to instruct the peer information handling system to change its designation to designation as a VRRP master node.

* * * * *